(12) United States Patent
Keltgen et al.

(10) Patent No.: US 11,415,441 B2
(45) Date of Patent: Aug. 16, 2022

(54) MAGNETIC FLOWMETER COMPOSITE FLOW TUBE LINER

(71) Applicant: Micro Motion, Inc., Boulder, CO (US)

(72) Inventors: Paul Michael Keltgen, Waconia, MN (US); Michael John Mayer, Waconia, MN (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

(21) Appl. No.: 17/024,079

(22) Filed: Sep. 17, 2020

(65) Prior Publication Data

US 2022/0082418 A1 Mar. 17, 2022

(51) Int. Cl.
*G01F 1/58* (2006.01)
*G01F 15/00* (2006.01)

(52) U.S. Cl.
CPC .............. *G01F 1/586* (2013.01); *G01F 1/58* (2013.01); *G01F 15/006* (2013.01)

(58) Field of Classification Search
CPC ................................. G01F 1/586; G01F 1/588
See application file for complete search history.

(56) References Cited

U.S. PATENT DOCUMENTS

| | | | |
|---|---|---|---|
| 3,347,568 A | 10/1967 | Weeden, Jr. et al. | |
| 3,695,104 A | 10/1972 | Mannherz et al. | |
| 4,206,640 A * | 6/1980 | Suzuki | G01F 1/60 73/861.16 |
| 6,330,831 B1 | 12/2001 | Lynnworth et al. | |
| 6,539,981 B1 * | 4/2003 | Kleven | G01F 1/64 138/104 |
| 7,637,169 B2 | 12/2009 | Shanahan et al. | |
| 7,823,461 B2 | 11/2010 | Kappertz et al. | |
| 9,027,418 B2 | 5/2015 | Smith et al. | |
| 9,127,974 B2 | 9/2015 | Rogers et al. | |
| 9,316,514 B2 | 4/2016 | Smith et al. | |
| 9,464,926 B2 | 10/2016 | Smith et al. | |
| 9,488,511 B2 | 11/2016 | Barto | |

(Continued)

FOREIGN PATENT DOCUMENTS

| | | |
|---|---|---|
| DE | 102014114289 A1 | 4/2016 |
| EP | 0581017 A1 | 2/1994 |

(Continued)

OTHER PUBLICATIONS

International Search Report and Written Opinion of the International Searching Authority from International Application No. PCT/US2021/022580, dated Jun. 28, 2021.

(Continued)

*Primary Examiner* — Randy W Gibson
*Assistant Examiner* — John M Royston
(74) *Attorney, Agent, or Firm* — Westman, Champlin & Koehler, P.A.

(57) ABSTRACT

A composite flow tube liner includes a cylindrical substrate and an interior layer. The cylindrical substrate includes a plurality of perforations and is configured for installation within a flow tube assembly of a magnetic flowmeter. The interior layer includes a fluoroelastomer and covers an interior surface of the substrate. The interior layer extends into the perforations of the cylindrical substrate, which secures the fluoroelastomer to the cylindrical substrate.

23 Claims, 11 Drawing Sheets

(56) References Cited

U.S. PATENT DOCUMENTS

| | | |
|---|---|---|
| 2005/0210997 A1 | 9/2005 | Lincoln et al. |
| 2008/0196510 A1 | 8/2008 | Nielsen |
| 2010/0317789 A1* | 12/2010 | Greene .................. C08K 7/26 |
| | | 524/494 |
| 2013/0305838 A1 | 11/2013 | Mikolichek et al. |
| 2013/0319133 A1* | 12/2013 | Lubbers ............... G01F 1/3263 |
| | | 73/861.49 |
| 2014/0000382 A1 | 1/2014 | Iijima |
| 2014/0083199 A1* | 3/2014 | Rogers .................. G01F 1/588 |
| | | 73/861.12 |
| 2014/0090483 A1 | 4/2014 | Smith et al. |
| 2016/0348812 A1* | 12/2016 | Hairston ............ F16L 55/1651 |

FOREIGN PATENT DOCUMENTS

| | | |
|---|---|---|
| EP | 0852703 A1 | 7/1998 |
| WO | 9712209 A1 | 4/1997 |
| WO | 2010094293 A1 | 8/2010 |

OTHER PUBLICATIONS

International Search Report and Written Opinion of the International Searching Authority from International Application No. PCT/US2021/027497, dated Jul. 12, 2021.

Scheirs J., "Fluoropolymers—Technology, Markets and Trends", A Rapra Industry Analysis Report, Rapra Review Reports, United Kingdom, Apr. 1, 2001 (Apr. 1, 2001), pp. 1-50, XP003032133.

Office Action from Chinese Patent Application No. 202022112780.2, dated Dec. 7, 2020.

Office Action from U.S. Appl. No. 16/906,219, dated Oct. 4, 2021.

* cited by examiner

MAGNETIC FLOWMETER COMPOSITE FLOW TUBE LINER

FIELD

Embodiments of the present disclosure relate to magnetic flowmeters and, more specifically, to flow tube liners for use with magnetic flowmeters.

BACKGROUND

Precise and accurate flow control is critical to a wide range of fluid processing applications, including bulk fluid handling, food and beverage preparation, chemistry and pharmaceuticals, water and air distribution, hydrocarbon extraction and processing, environmental control, and a range of manufacturing techniques utilizing thermoplastics, thin films, glues, resins and other fluid materials, for example. Flow rate measurement technologies used in each particular application depend upon the fluids involved, and on the relevant process pressures, temperatures and flow rates.

Exemplary flow rate measuring technologies include turbine devices that measure flow as a function of mechanical rotation, pitot sensors and differential pressure devices that measure flow as a function of the Bernoulli effect or pressure drop across a flow restriction, vortex and Coriolis devices that measure flow as a function of vibrational effects, and mass flowmeters that measure flow as a function of thermal conductivity. Magnetic flowmeters are distinguished from these technologies by characterizing a flow based on Faraday's Law, which depends upon electromagnetic interactions rather than mechanical or thermodynamic effects. In particular, magnetic flowmeters rely upon the conductivity of the process fluid, and the electromotive force (EMF) induced as the fluid flows through a region of magnetic field.

Conventional magnetic flowmeters include a sensor section, a transmitter section and a flow tube assembly. The flow of fluid to be measured travels through a pipe section of the flow tube assembly. A pair of electrodes are positioned to contact the flow. The electrodes extend through a non-conductive liner that electrically insulates the fluid from the pipe section, and prevents the fluid from forming a short circuit between the electrodes and the pipe section.

The transmitter section includes a current generator that drives a current through a coil of the sensor section to generate a magnetic field across the pipe section and the flow. The magnetic field induces the EMF or potential difference (voltage) across the flow that is proportional to the velocity of the flow. The magnetic flowmeter measures the voltage difference using the electrodes, and determines the flow rate of the flow based on the measured voltage difference.

Conventional liners are formed of a polymer that is compatible with the process fluid. Rubber liners may be adhesively bonded to the inside diameter of the pipe section of the flow tube assembly and flange faces, and then vulcanized to complete the installation.

The high chemical and temperature resistance of fluoroelastomers, such as FKM, make them desirable candidates for use in forming flow tube liners. Unfortunately, there are challenges to manufacturing flow tube liners using these materials. For example, fluoroelastomers can only be bonded during vulcanization and before it is fully cured. However, the thermal mass of the flow tube assembly hinders efficient adhesive bonding and vulcanizing of fluoroelastomers. Accordingly, the benefits of using a fluoroelastomer liner in a flow tube assembly have yet to be realized.

SUMMARY

Embodiments of the present disclosure are directed to a composite flow tube liner for a flow tube assembly of a magnetic flowmeter, a magnetic flow tube assembly that includes the composite flow tube liner, and methods of forming the composite flow tube liner. One embodiment of the composite flow tube liner includes a cylindrical substrate and an interior layer. The cylindrical substrate includes a plurality of perforations and is configured for installation within a flow tube assembly of a magnetic flowmeter. The interior layer includes a fluoroelastomer and covers an interior surface of the substrate. The interior layer extends into the perforations of the cylindrical substrate, which secures the fluoroelastomer to the cylindrical substrate.

In one embodiment, the flow tube assembly includes a pipe section, and a coil configured to receive a coil current and produce a magnetic field across the pipe section. The magnetic field induces an electromotive force (EMF) in a fluid flow traveling through an interior of the pipe section. The composite flow tube liner is secured within the interior of the pipe section.

In one embodiment of the method of forming a composite flow tube liner for a flow tube assembly of a magnetic flowmeter, a cylindrical substrate is provided that includes a plurality of perforations and an open interior. A sheet including a fluoroelastomer is inserted within the interior of the cylindrical substrate. The sheet is pressed against an interior surface of the cylindrical substrate causing portions of the sheet to extend into the perforations of the cylindrical substrate, which secures the fluoroelastomer to the cylindrical substrate.

In accordance with another embodiment of the method, a substrate sheet is provided having a plurality of perforations and first and second surfaces. A liner sheet including a fluoroelastomer is applied over the first surface of the substrate sheet. The liner sheet is pressed against the first surface of the substrate sheet causing portions of the liner sheet to extend into the perforations of the substrate sheet, which secures the liner sheet to the substrate sheet and forms a composite liner sheet. The composite liner sheet is formed into a cylinder. The second surface of the substrate sheet forms an exterior of the cylinder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form, in order to avoid obscuring the embodiments in unnecessary detail.

Figure 1:
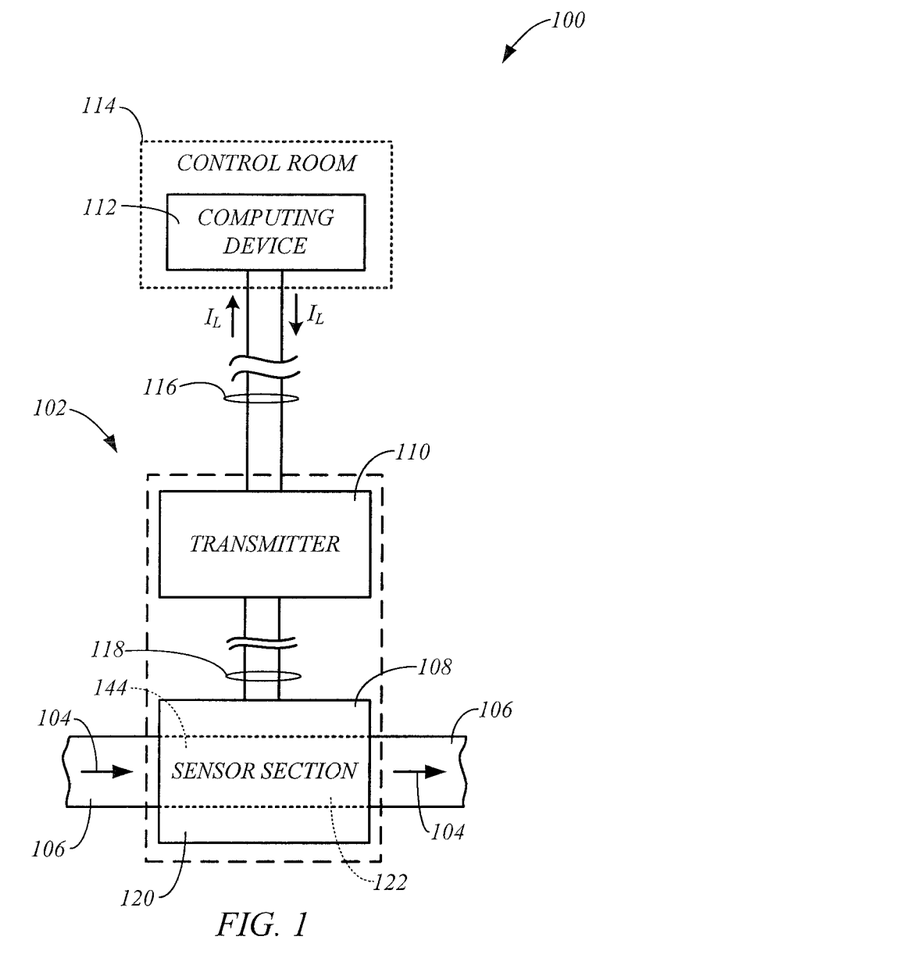
FIG. 1 is a simplified diagram of an example of an industrial process measurement system, in accordance with embodiments of the present disclosure.

FIG. 1 is a simplified diagram of an exemplary industrial process measurement system 100, in accordance with embodiments of the present disclosure. The system 100 may be used in the processing of a material (e.g., process medium) to transform the material from a less valuable state into more valuable and useful products, such as medicine, chemicals, paper, food, etc. For example, the system 100 may be used in an oil refinery that performs industrial processes that can process crude oil into gasoline, fuel oil, and other petrochemicals.

The system 100 includes a magnetic flowmeter 102 that is configured to sense a flow rate of a process fluid flow 104, such as through pipe sections 106, for example. The magnetic flowmeter 102 includes a sensor section 108 and a transmitter 110. The sensor section 108 is generally configured to measure or sense the flow rate of the fluid flow 104. The transmitter 110 is generally configured to control the sensor section 108 to measure the flow rate, and optionally communicate the measured flow rate to an external computing device 112, such as a computerized control unit, which may be remotely located from the flowmeter 102, such as in a control room 114 of the system 100.

The transmitter 110 may communicate with the external computing device 112 over a suitable process control loop. In some embodiments, the process control loop includes a physical communication link, such as a two-wire control loop 116, or a wireless communication link. Communications between the external computing device 112 and the transmitter section may be performed over the control loop 116 in accordance with conventional analog and/or digital communication protocols. In some embodiments, the two-wire control loop 116 includes a 4-20 milliamp control loop, in which a process variable may be represented by a level of a loop current $I_L$ flowing through the two-wire control loop 116. Exemplary digital communication protocols include the modulation of digital signals onto the analog current level of the two-wire control loop 116, such as in accordance with the HART® communication standard. Other purely digital techniques may also be employed including Foundation Fieldbus, Profibus, and Modbus communication protocols. Exemplary wireless versions of the process control loop include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the magnetic flowmeter 102 from any suitable power source, such as AC or DC power sources. For example, the magnetic flowmeter 102 may be wholly powered by the loop current $I_L$ flowing through the control loop 116. One or more power supplies may also be utilized to power the magnetic flowmeter 102, such as an internal or an external battery. An electrical power generator (e.g., solar panel, a wind power generator, etc.) may also be used to power the magnetic flowmeter 102, or charge a power supply used by the magnetic flowmeter 102.

The transmitter 110 may be directly attached to the sensor section 108, such as to a housing containing the sensor section 108, or the transmitter 110 may be located remotely (e.g., 10-1000 feet) from the sensor section 108. When the transmitter 110 is remotely located from the sensor section 108, electrical connections between the transmitter 110 and sensor section 108 may be provided by one or more connecting cables or transmission lines 118, which may be formed by cables, wires, a data bus, a control bus, or other suitable connection for electrical and data communication.

Figure 2:
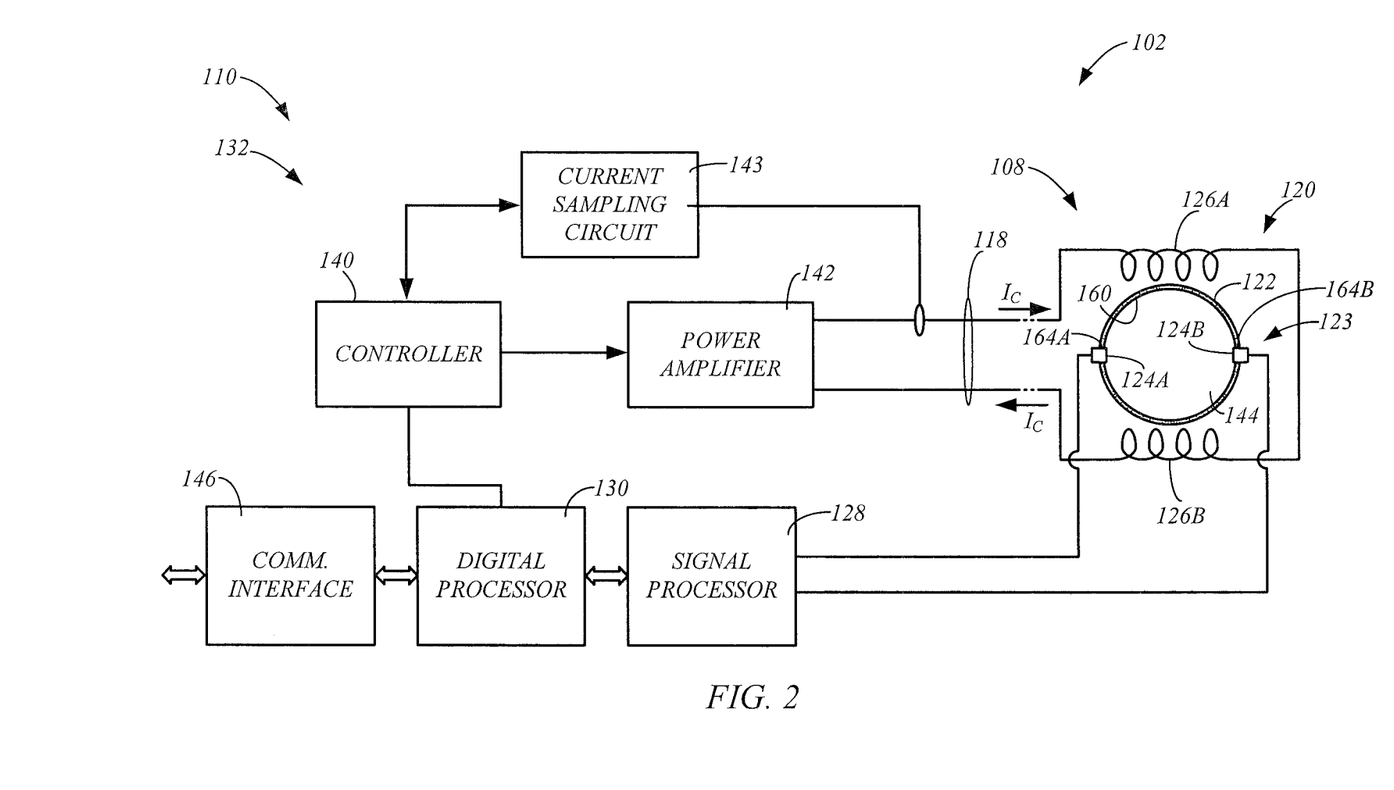
FIG. 2 is a schematic diagram of an example of a magnetic flowmeter, in accordance with embodiments of the present disclosure.

FIG. 2 is a simplified diagram of the magnetic flowmeter 102, in accordance with embodiments of the present disclosure. The sensor section 108 may include a flow tube assembly 120 having a pipe section 122, through which the fluid flow 104 travels. The flow tube assembly 120 also includes an EMF sensor 123 having electrodes 124, such as electrodes 124A and 124B, and the flow tube assembly 120 includes one or more field coils or coil wires 126, such as coils 126A and/or 126B. The electrodes 124A and 124B, and the coils 126A and 126B may each be positioned on opposing sides of the pipe section 122 from each other, as shown in FIG. 2.

A digital processor 130 may represent one or more processors that control components of the magnetic flowmeter 102 to perform one or more functions described herein in response to the execution of instructions, which may be stored in non-transitory, patent eligible memory or computer readable media. In some embodiments, the digital processor 130 provides control signals to the current generator 132 based on an operating setpoint of the magnetic flowmeter 102, to generate a coil current $I_C$ comprising, for example, DC current pulses (e.g., square wave current pulses) that alternate direction through the coils 126. Other types of alternating coil currents may also be used.

In some embodiments, the current generator 132 includes a controller 140 and a power amplifier 142. The controller 140 may represent one or more processors that control components of the power amplifier 142 to perform one or more functions described herein, such as in response to control signals from the digital processor 130, and/or in response to the execution of instructions, which may be stored in non-transitory, patent eligible memory or computer readable media represented by the controller 140.

The controller 140 controls the power amplifier 142 to generate a coil current $I_C$ based on a setpoint level for the magnetic flowmeter 102. The controller 140 may periodically receive current level measurements of the coil current $I_C$ from a current sampling circuit 143 as feedback to determine if an adjustment to the coil current $I_C$ is required to match the setpoint level for the magnetic flowmeter 102, which is necessary for accurate flow rate measurements.

The current sampling circuit 143 may take on any suitable form. For example, the current sampling circuit 143 may operate to sense a voltage that is related to the coil current $I_C$, such as at the location shown in FIG. 2, and convert the sampled voltage to a digital signal using an analog-to-digital converter that is presented to the controller 140 as a measured current level, for example. The controller 140 may adjust the coil current $I_C$ based on the measured current level in an attempt to match the current level of the coil current $I_C$ to the setpoint current level directed by the operating setpoint of the magnetic flowmeter 102.

The coil current $I_C$ is delivered to the field coils 126A and/or 126B of the flow tube assembly 120 through a suitable electrical connection, such as the transmission line 118 shown in FIGS. 1 and 2. This causes the coils 126A and/or 126B to generate a magnetic field across the pipe section 122 that changes direction at a desired excitation frequency. The process fluid flow 104 traveling through the interior 144 of pipe section 122 functions as a moving conductor that induces EMF in the fluid in accordance with Faraday's law of electromagnetic induction. The electrodes 124A and 124B, which may include electrode components that provide a capacitive coupling to the conductive process fluid or a direct electrical coupling to the conductive process fluid, pick up the voltages present in the fluid flow 104. The difference in the voltages at the electrodes 124A and 124B is proportional to the rate of the fluid flow 104.

The signal processor 128 of the transmitter 110 is connected to the electrodes 124A and 124B. The flow tube assembly 120 may be electrically grounded to the pipe section 122, to a flange or pipe section upstream or downstream of the pipe section 122, or to another suitable ground connection. The digital processor 130 controls the signal processor 128 to sample the voltage difference between the electrodes 124A and 124B, and provide the measured voltage difference to the digital processor 130, using any suitable technique. This may involve converting an analog differential voltage signal to a digital value that is supplied to the digital processor 130, for example. The digital processor 130 may perform further signal processing of measured differential voltage to establish a flow rate measurement of the flow rate of the process fluid flow 104. The measured flow rate may be communicated to the computing device 112 using a communications interface 146, such as through one of the wired or wireless communication protocols discussed above.

Figure 3:
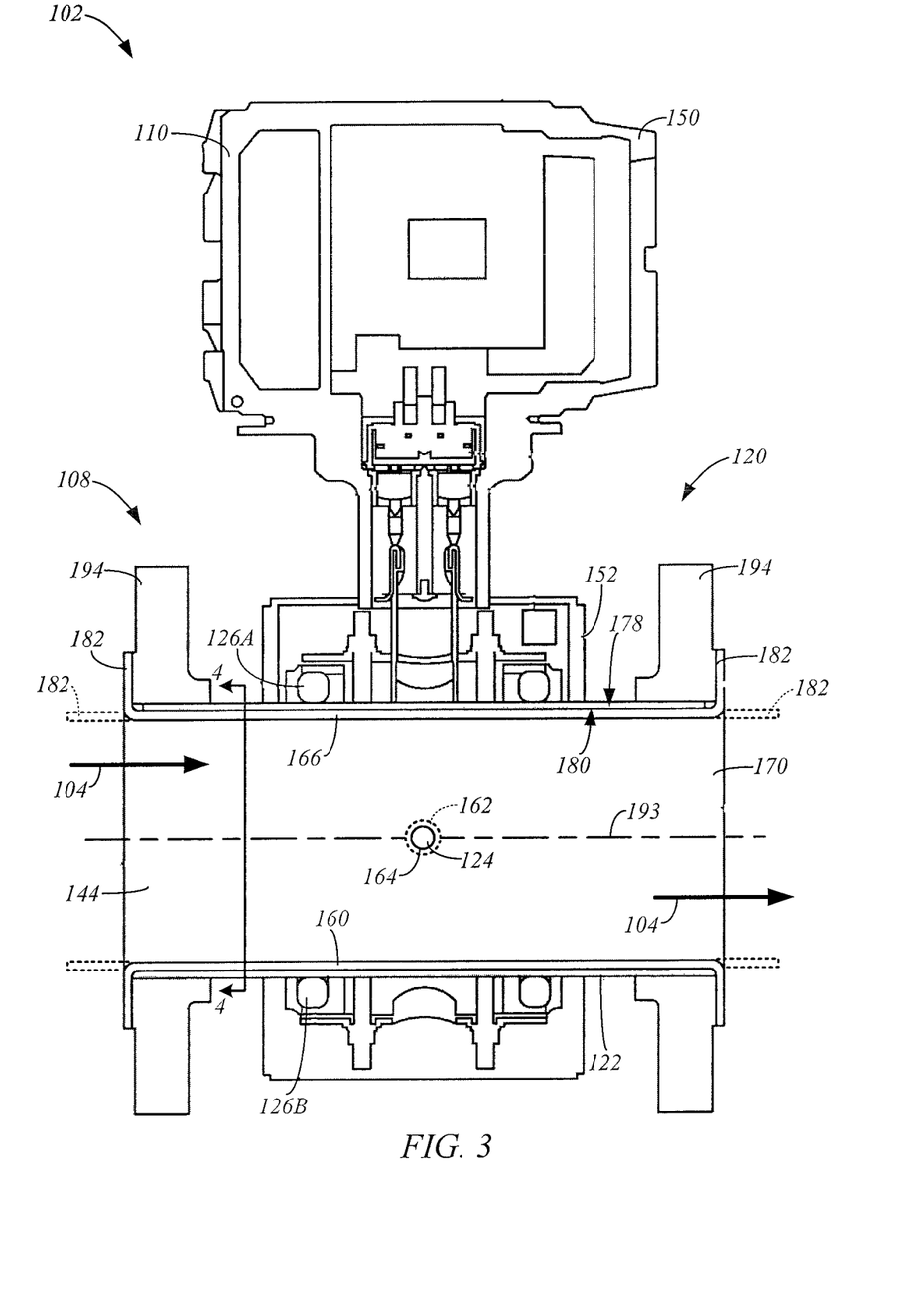
FIG. 3 is a simplified cross-sectional view of an example of a magnetic flowmeter, in accordance with embodiments of the present disclosure.

FIG. 3 is a simplified cross-sectional view of an example of magnetic flowmeter 102, in accordance with embodiments of the present disclosure. In some embodiments, the magnetic flowmeter 102 includes a transmitter housing 150, which may contain circuitry forming the transmitter 110, such as the signal processor 128, the digital processor 130, the communications interface 146, the controller 140, the power amplifier 142, and/or other components. A magnetics compartment 152 may surround the pipe section 122 of the flow tube assembly 120 and contain the one or more field coils 126, the electrodes 124, and/or other components. As mentioned above, the field coils 126, such as field coils 126A and 126B, may be located opposite each other on the outside of the pipe section 122 (e.g., above and below the pipe section 122).

A composite flow tube liner 160 of the flow tube assembly 120, formed in accordance with one or more embodiments described herein, seals the pipe section 122 from the interior 144, through which the fluid flow 104 travels. The electrodes 124 may extend through tunnels 162 of the pipe section 122 while being electrically insulated from the pipe section 122. The electrodes 124 and/or electrical connections to the electrodes 124 may extend through apertures 164 of the liner 160, and into the interior 144 to contact the fluid flow 104. The apertures 164 may be located on opposing sides of the liner 160, such as indicated by apertures 164A and 164B in FIG. 2. The liner 160 may include additional apertures 164 as necessary to accommodate additional electrodes 124, such as a reference electrode, for example. The liner 160 may provide a seal with the electrodes 124 at the apertures 164 to prevent fluid penetration to the pipe section 122.

Embodiments of the composite flow tube liner 160 include a layer of fluoroelastomer that provides high chemical resistance to the process fluid flow 104. The fluoroelastomer layer of the composite flow tube liner 160 also provides protection from permeation of the process fluid to the pipe section 122 during operation. This protects the magnetic flowmeter 102 from the formation of a short circuit between the fluid flow 104, the pipe section 122 and electrodes 124A or 124B, which would render the magnetic flowmeter 102 inoperable.

Figure 4:
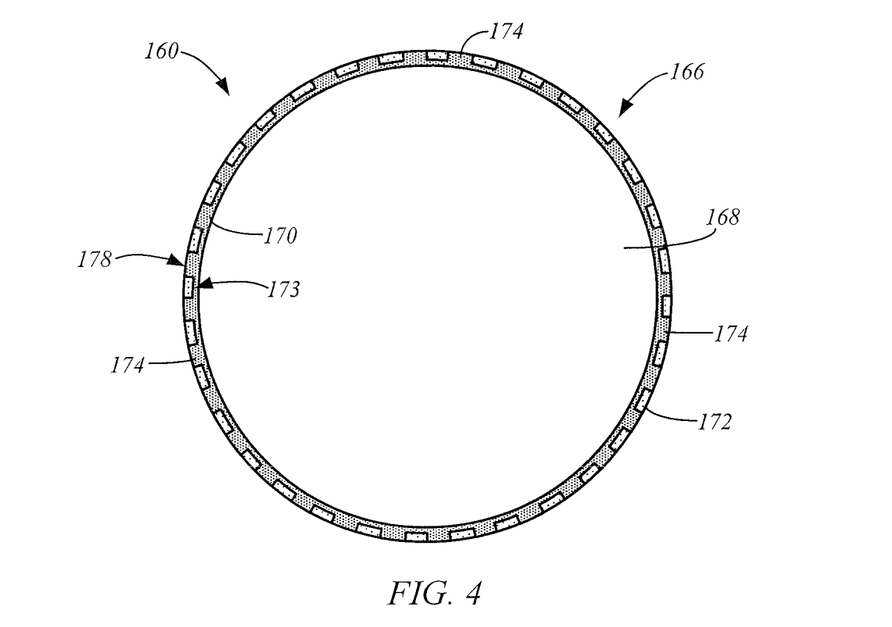
FIGS. 4 and 5 respectively are a simplified cross-sectional view of a composite flow tube liner of FIG. 3 taken along line 4-4, and a simplified side plan view of the flow tube assembly of FIG. 3, in accordance with embodiments of the present disclosure.
Figure 5:
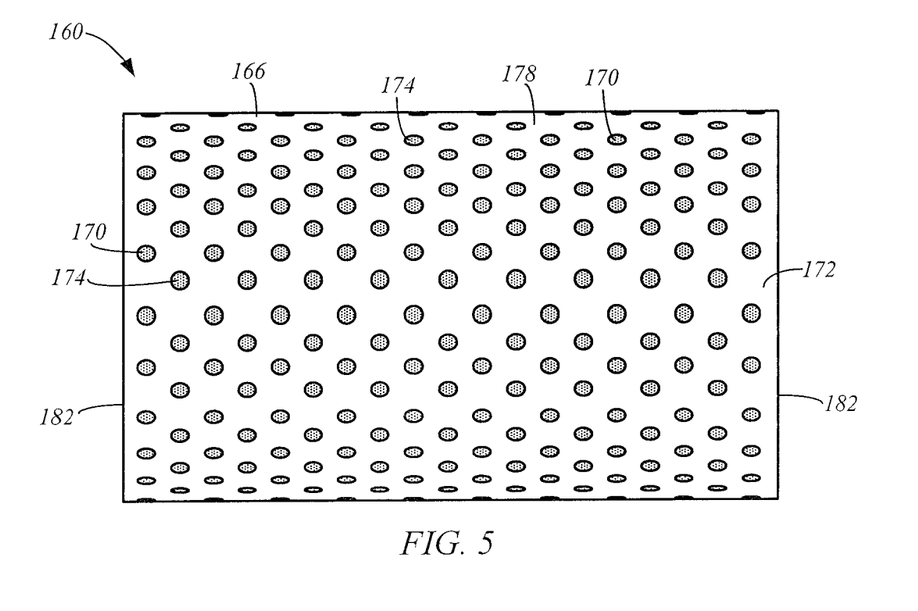

FIGS. 4 and 5 respectively are a simplified cross-sectional view of the composite flow tube liner 160 of FIG. 3 taken along line 4-4, and a simplified side plan view of the liner 160 of FIG. 3, in accordance with embodiments of the present disclosure. The illustrated features are not shown to scale. In some embodiments, the composite flow tube liner 160 includes a composite (e.g., multi-layered) cylindrical wall 166 having an open interior 168 that substantially surrounds the interior 144 of the pipe section and receives the process fluid flow 104. The wall 166 includes an interior layer 170 and a cylindrical substrate 172, which may form an exterior layer of the liner 160. In one embodiment, the interior layer 170 is directly attached to the cylindrical substrate. Alternatively, embodiments of the liner 160 may include one or more intermediary layers (not shown) positioned between the interior layer 170, or portions of the interior layer 170, and the cylindrical substrate 172.

In some embodiments, the interior layer 170 comprises a fluoroelastomer, such as FKM, which is a family of fluoroelastomer materials defined by the American Society for Testing and Materials (ASTM) standard D1418, or another suitable fluoroelastomer. The fluoroelastomer interior layer 170 provides electrical insulation and chemical resistance to the process fluid flow 104 (FIG. 1).

The fluoroelastomer may form substantially 100% (e.g., at least 98%) of the interior layer 170 by weight. Alternatively, the fluoroelastomer may form at least 50%, at least 75%, at least 90%, and at least 95% of the interior layer 170 by volume or weight.

The cylindrical substrate 172 may be formed of metal. The metal may form a substantial entirety (e.g., greater than 90% by volume or weight) of the substrate 172. Examples of the metal include aluminum, stainless steel, gold, copper, titanium, chromium, tantalum, vanadium, nickel and metallic oxides.

The fluoroelastomer interior layer 170 may be bonded to the interior side 173 of the cylindrical substrate 172 using one or more of the techniques described herein. In some embodiments, the cylindrical substrate 172 has a plurality of perforations 174 that facilitate bonding the fluoroelastomer interior layer 170 to the interior side 173 of the cylindrical substrate 172.

Figure 6A:
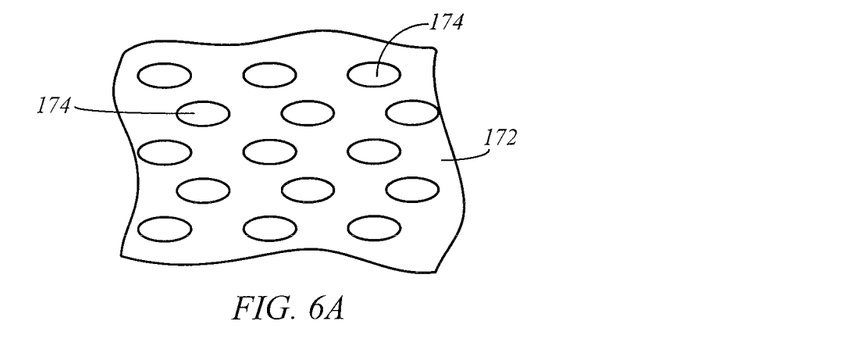
FIGS. 6A-C are simplified side views of portions of cylindrical substrates of the composite liner, in accordance with embodiments of the present disclosure.
Figure 6B:
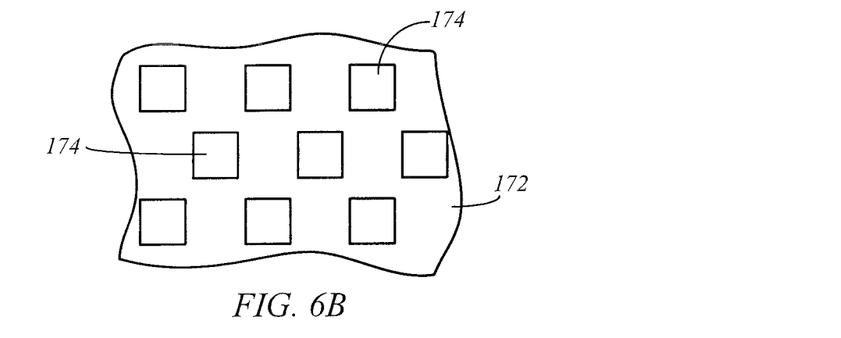
Figure 6C:
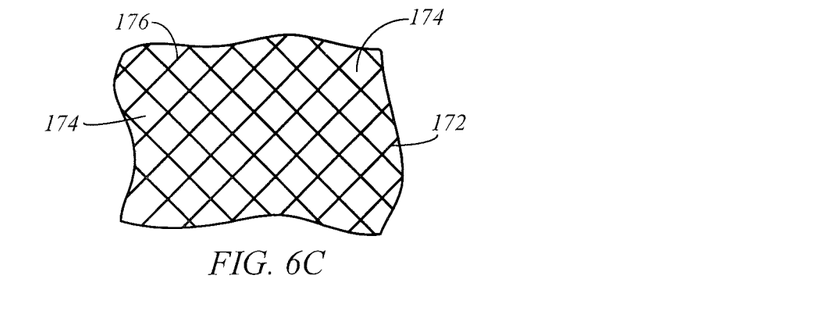

The perforations 174 may take on a variety of shapes. In one embodiment, the perforations 174 are substantially circular, as shown in FIG. 5. FIGS. 6A-C are simplified side views of portions of cylindrical substrates 172, in accordance with embodiments of the present disclosure. In some embodiments, the perforations 174 may have an oval shape, as shown in FIG. 6A, or a rectangular shape, as shown in FIG. 6B. In some embodiments, the cylindrical substrate 172 is formed of a wire mesh 176 having perforations 174 defined by the openings through the wire mesh 176, as illustrated in FIG. 6C.

As described below in greater detail, the fluoroelastomer interior layer 170 may be pressed against the interior side 173 of the cylindrical substrate, resulting in portions of the fluoroelastomer interior layer 170 extending at least partially into the perforations 174 of the cylindrical substrate 172. The fluoroelastomer interior layer 170 may be cured in this configuration using heat to fixedly bond the fluoroelastomer interior layer 170 to the cylindrical substrate 172, and form the composite flow tube liner 160.

An exterior surface 178 of the cylindrical substrate 172 may be secured within the interior 144 of the pipe section 122 using any suitable technique. As discussed below, this may involve bonding (e.g., adhesively bonding or welding) the exterior surface 178 to an interior surface 180 of the pipe section, and/or flaring ends 182 of the composite flow tube liner 160, as shown in FIG. 3.

Figure 7:
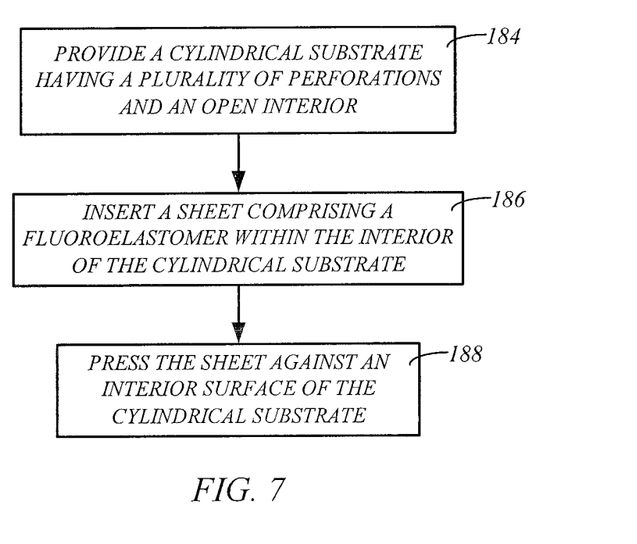
FIG. 7 is a flowchart illustrating a method of forming a composite flow tube liner, in accordance with embodiments of the present disclosure.

FIG. 7 is a flowchart illustrating a method of forming a composite flow tube liner 160, in accordance with embodiments of the present disclosure. FIGS. 8-11 are simplified side cross-sectional views of the flow tube liner 160 at various stages of the method of FIG. 7, in accordance with embodiments of the present disclosure.

Figure 8:
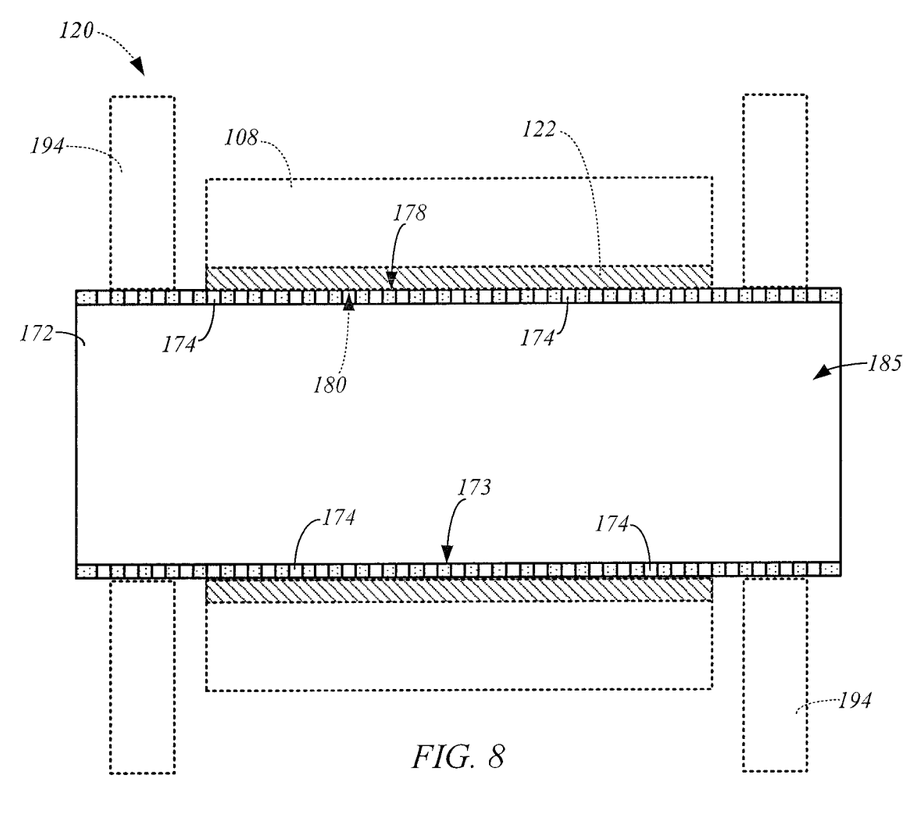
FIGS. 8-11 are simplified side cross-sectional views of a flow tube liner at various stages of the method of FIG. 7, in accordance with embodiments of the present disclosure.

At 184 of the method, a cylindrical substrate 172 is provided having a plurality of perforations 174 and an open interior 185, as shown in FIG. 8. In some embodiments, the cylindrical substrate 172 may be separated from the flow tube assembly 120, and the remaining steps of the method are performed to complete the manufacture of flow tube liner 160 before it is installed in the pipe section 122 of the flow tube assembly 120. Alternatively, the cylindrical substrate 172 is secured within the pipe section 122 of the flow tube assembly 120 using any suitable technique (e.g., adhering, welding, flaring ends 182, etc.) prior to performing the remaining steps of the method described below.

Figure 9:
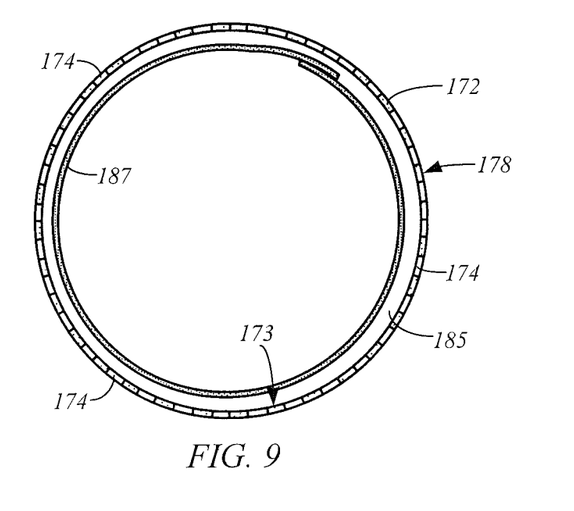

At 186 of the method, one or more liner sheets 187 (hereinafter "sheet") comprising an uncured fluoroelastomer is inserted within the interior 185 of the cylindrical substrate 172. The sheet 187 corresponds to the interior layer 170. The sheet 187 may be rolled into a circle such that it covers the interior side 173 of the cylindrical substrate 172, as shown in FIG. 9.

Figure 10:
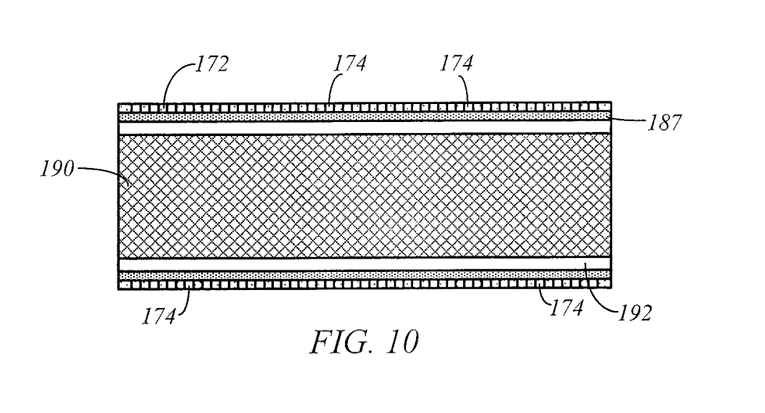
Figure 11:
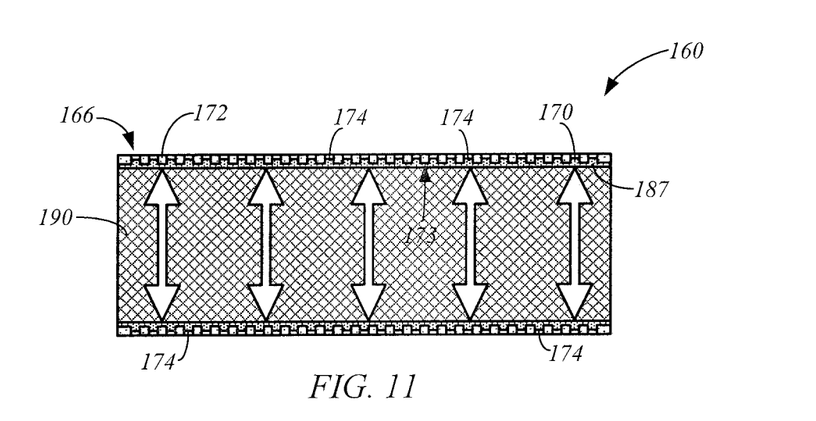

At 188, the sheet 187 is pressed against the interior surface 173 of the cylindrical substrate 172. This method step may be performed using any suitable technique. In one embodiment, a forming mandrel 190 is inserted on an interior side 192 of the sheet 187, as shown in FIG. 10. The mandrel 190 is then inflated to radially press the sheet 187 against the interior surface 173 to form the interior layer 170, as illustrated in FIG. 11, and complete the pressing step 188.

The sheet 187 may be heated before, during and/or after the pressing step 188. In one embodiment, the sheet 187 is initially heated to a flow temperature (e.g., a temperature of about 120° C. (248° F.)) at which the fluoroelastomer within the sheet 187 flows, but will not begin to cure. This ensures that the fluoroelastomer is malleable and fills or at least extends partially into the perforations 174, as shown in FIGS. 4 and 11, during the pressing step 188.

This heating of the sheet 187 may be performed by heating the mandrel 190, and/or applying heat directly to the sheet 187 and/or the cylindrical substrate 172 using a suitable heating device. When the cylindrical substrate 172 is secured within the pipe section 122 of the flow tube assembly 120 during the step 188, the pipe section 122 may be heated to heat the cylindrical substrate 172 and the sheet 187 to the flow temperature while it is contained in the interior side of the substrate 172 and pressed against the surface 173.

After the pressing step 188, the pressed sheet 187 or interior layer 170 having portions that extend at least partially into the perforations of the cylindrical substrate 172, as shown in FIG. 4, may be heated to a curing temperature (e.g., a temperature range of about 140-176° C. (284-350° F.)), which is greater than the flow temperature, to fully cure the fluoroelastomer sheet 187 or interior layer 170 in its pressed position. The composite wall 166 formed of the interior layer 170 and the cylindrical substrate 172 may then be cooled. This results in the interior layer 170 being bonded to the cylindrical substrate and may complete the formation of the composite flow tube liner 160, in accordance with some embodiments.

Figure 12:
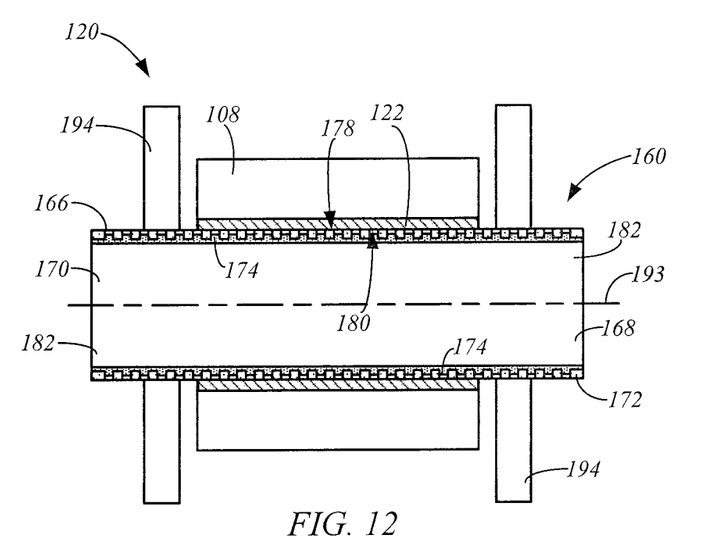
FIGS. 12 and 13 are simplified side cross-sectional views illustrating the installation of a composite flow tube liner into a flow tube assembly, in accordance with embodiments of the present disclosure.

When the completed flow tube liner 160 is separate from the flow tube assembly 120, it may be secured within the pipe section 122 of the flow tube assembly 120 using various techniques. In some embodiments, the pipe section 122 includes a central axis 193, and the flow tube liner 160 is inserted within the pipe section 122 such that it is substantially concentric with the central axis 193, as shown in FIG. 12. The flow tube liner 160 may then be secured within the pipe section 122 using any suitable technique, such as adhering or welding the exterior surface 178 of the cylindrical substrate 172 to the interior surface 180 of the pipe section 122, and/or flaring the ends 182 of the flow tube liner 160, as shown in FIGS. 3 and 13.

Figure 13:
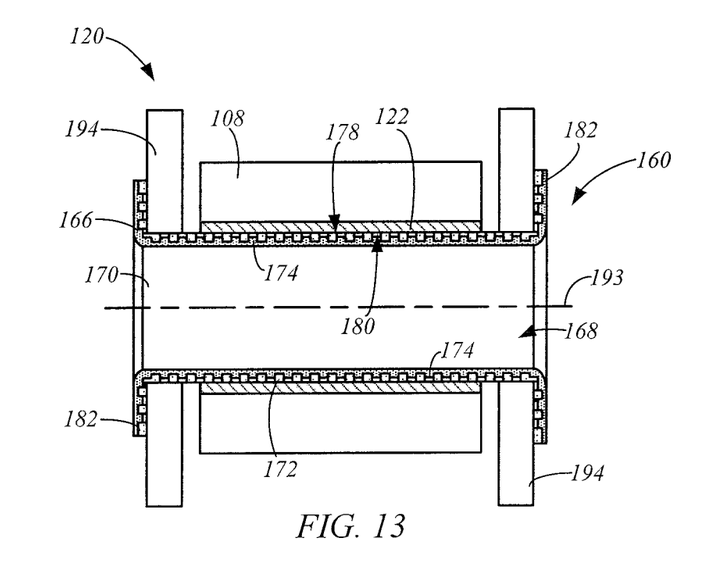

The ends 182 of the flow tube liner 160 may be flared using a suitable tube flaring tool, such that the ends 182 extend away from the central axis 193, as shown in FIGS. 3 and 13. The flared ends 182 may be pinched between a flange 194 attached to the pipe section 122 and a flange of pipe sections that adjoin the pipe section 122, from which the fluid flow 104 may be received and discharged by the pipe section 122, such as by pipe sections 106 shown in FIG. 1. This secures the flow tube liner 160 within the pipe section 122 and may complete the formation of the flow tube assembly, according to some embodiments.

Figure 14:
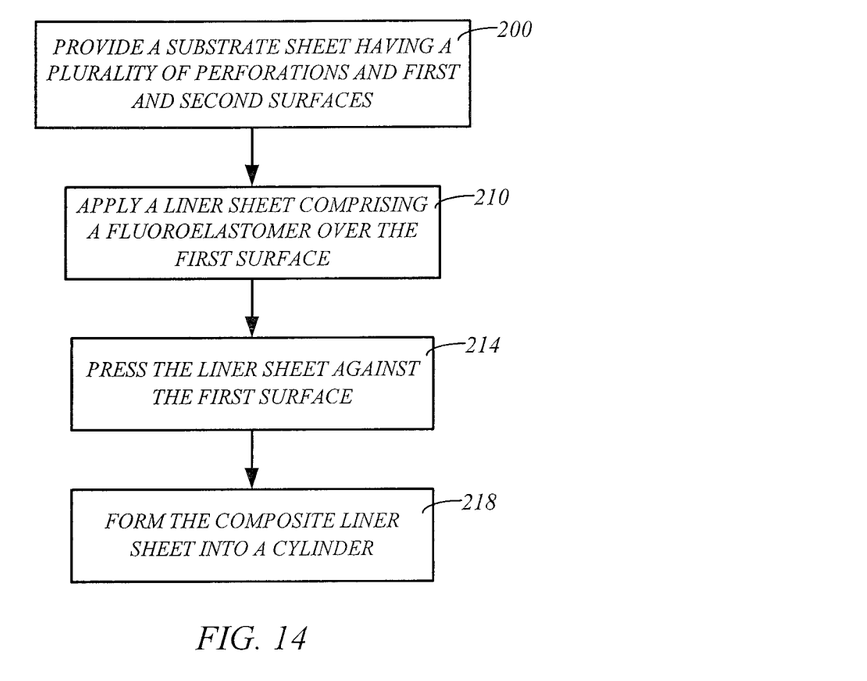
FIG. 14 is a flowchart illustrating a method of forming a composite flow tube liner, in accordance with embodiments of the present disclosure.

FIG. 14 is a flowchart illustrating a method of forming a composite flow tube liner 160, in accordance with embodiments of the present disclosure. FIGS. 15-18 are simplified side cross-sectional views of the flow tube liner 160 at various stages of the method of FIG. 14, in accordance with embodiments of the present disclosure.

Figure 15:
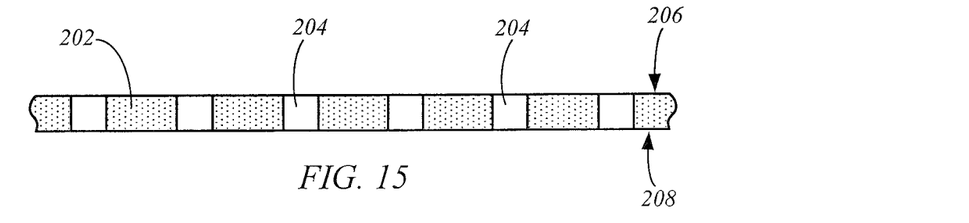
FIGS. 15-18 are simplified side cross-sectional views of the flow tube liner at various stages of the method of FIG. 14, in accordance with embodiments of the present disclosure.

At 200 of the method, a substrate sheet 202 is provided having a plurality of perforations 204, a first surface 206 and an opposing second surface 208, as shown in FIG. 15. The substrate sheet 202 will be used to form the cylindrical substrate 172 of the composite flow tube liner 160, in accordance with one or more embodiments described above. The perforations 204 extend from the first surface 206 to the second surface 208, and may be formed in accordance with the embodiments of the perforations 174 described above.

Figure 16:
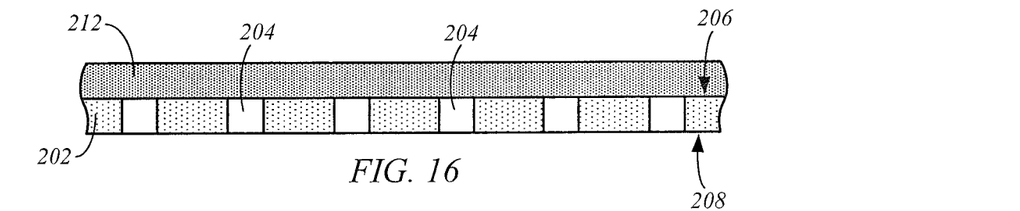

At 210 of the method, a liner sheet 212 comprising a fluoroelastomer, such as FKM, is applied over the surface 206 of the substrate sheet 202, as shown in FIG. 16. The liner sheet 212 will be used to form the interior layer 170 of the composite flow tube liner 160, in accordance with one or more embodiments described above.

Figure 17:
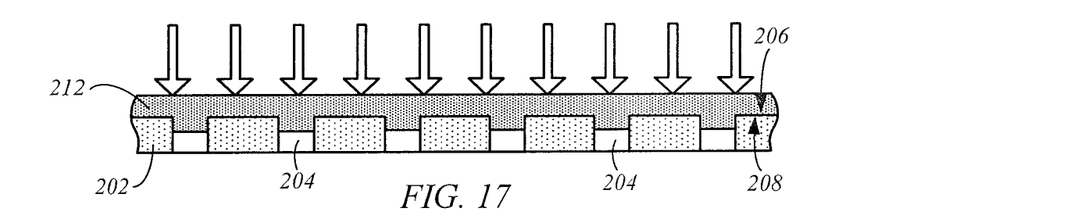
Figure 18:
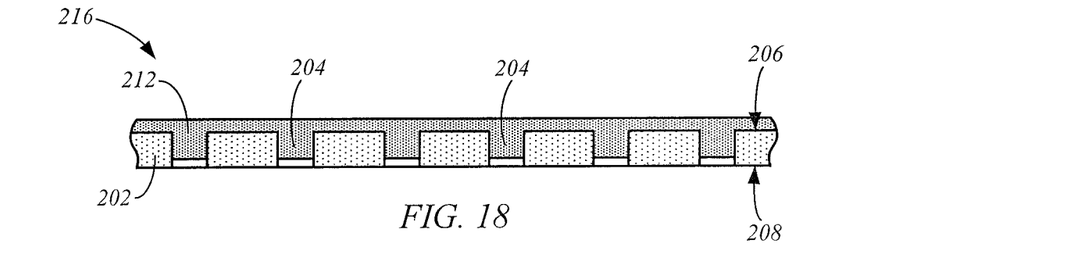

At 214 of the method, the liner sheet 212 is then pressed against the surface 206, as indicated in FIG. 17. The liner sheet 212 may be pressed against the surface 206 using a plate, a roller, or another suitable component. This causes portions of the liner sheet 212 to extend into the perforations 204. This secures the liner sheet 212 to the substrate sheet 202, and results in the formation of a composite liner sheet 216, which is shown in FIG. 18.

At 218 of the method, the composite liner sheet 216 is formed into a cylinder to form the composite flow tube liner 160 (FIGS. 4 and 5), in which the substrate sheet 202 forms the substrate cylinder 172, and the liner sheet 212 forms the interior layer 170. Thus, the second surface 208 of the substrate sheet 202 corresponds to the exterior surface 178 of the cylindrical substrate 172. In some embodiments, the composite liner sheet 216 may be cut to a desired size before rolling the sheet 216 into the cylinder. The composite liner sheet 216 may also be formed large enough to allow multiple sections to be cut from the sheet 216, and each section used to form composite flow tube liner 160.

In some embodiments, the sheet 216 is rolled into a cylinder and adjoining ends of the substrate sheet 202 are secured together using a suitable technique to form the flow tube liner 160 that is configured for subsequent installation into the pipe section 122 of a flow tube assembly 120. Heat may be applied to the sheet 212 to ensure that all seems are sealed by the sheet 212.

Alternatively, the composite liner sheet 216 may be rolled into a cylinder, inserted into the pipe section 122, and secured or bonded to the pipe section 122 to form the flow tube liner 160 and the flow tube assembly 120, as shown in FIG. 3, for example. In one embodiment, the surface 208 corresponding to the exterior surface 178 of the substrate cylinder 172 may be adhered to the interior surface 180 of the pipe section 122 using a suitable adhesive, and/or the ends 182 may be flared to secure the flow tube liner 160 formed from the composite sheet 216 to the pipe section 122.

In some embodiments of the method, the liner sheet 212 comprises uncured fluoroelastomer, and the method includes heating the liner sheet 212 before, during and/or after the pressing step 214. In one embodiment, the liner sheet 212 is heated before or during the pressing step 214 to a flow temperature, at which the fluoroelastomer is malleable or flows. This enhances the extension of portions of the liner sheet 212 into the perforations 204 of the substrate sheet 202 during the pressing step 214. This heating, as well as the pressing step 214, may be completed prior to or after the composite liner sheet 216 or flow tube liner 160 formed using the composite liner sheet 216 is installed in the pipe section 122 of the flow tube assembly. In some embodiments, the flow temperature is less than a cure temperature at which the fluoroelastomer of the liner sheet 212 cures.

After the formation of the composite liner sheet 216, the liner sheet 212 may be heated to at least the cure temperature of the fluoroelastomer to cure the liner sheet 216. This may be completed prior to or after the composite liner sheet 216 or flow tube liner 160 formed using the composite liner sheet 216 is installed in the pipe section 122 of the flow tube assembly.

Although the embodiments of the present disclosure have been described with reference to preferred embodiments, workers skilled in the art will recognize that changes may be made in form and detail without departing from the spirit and scope of the present disclosure.

What is claimed is:

1. A method comprising forming a composite flow tube liner for a flow tube assembly of a magnetic flowmeter comprising:
   providing a cylindrical substrate comprising a plurality of perforations and an open interior;
   inserting a sheet comprising a chemically resistant fluoroelastomer within the interior of the cylindrical substrate;
   pressing the sheet against an interior surface of the cylindrical substrate, wherein portions of the sheet extend into the perforations of the cylindrical substrate, which secures and adheres the fluoroelastomer to the cylindrical substrate; and
   wherein pressing the sheet against the interior surface of the cylindrical substrate comprises:
      inserting a forming mandrel within the interior of the cylindrical substrate; and
      expanding the mandrel against an interior surface of the sheet, which presses the sheet against the interior surface of the cylindrical substrate.

2. The method of claim 1, wherein the fluoroelastomer of the sheet is fully cured.

3. The method of claim 1, wherein:
   the fluoroelastomer is uncured;
   the method comprises heating the sheet; and
   pressing the sheet against the interior surface of the cylindrical substrate comprises pressing the heated sheet against the interior surface of the cylindrical substrate.

4. The method of claim 3, wherein:
   heating the sheet comprises heating the sheet to a first temperature at which the fluoroelastomer flows but will not begin to cure; and
   the method comprises curing the fluoroelastomer after pressing the sheet including heating the sheet to a second temperature that is greater than the first temperature.

5. The method of claim 1, further comprising forming a magnetic flowmeter comprising:
   providing:
      a pipe section; and
      a coil configured to receive a coil current and produce a magnetic field across the pipe section that induces an electromotive force (EMF) in a fluid flow traveling through an interior of the pipe section; and
   securing the composite flow tube liner within the interior of the pipe section.

6. The method of claim 5, wherein securing the composite flow tube liner within the interior of the pipe section comprises bonding an exterior surface of the cylindrical substrate to an interior surface of the pipe section prior to inserting the sheet and pressing the sheet.

7. The method of claim 5, wherein:
the pipe section includes a central axis; and
securing the composite flow tube liner within the interior of the pipe section comprises flaring opposing ends of the composite flow tube liner positioned outside the pipe section away from the central axis.

8. A flow tube assembly for use with a magnetic flowmeter to measure a flow rate of a fluid flow comprising:
a pipe section;
a coil configured to receive a coil current and produce a magnetic field across the pipe section that induces an electromotive force (EMF) in a fluid flow traveling through an interior of the pipe section; and
the composite flow tube liner of claim 1 secured within the interior of the pipe section.

9. The flow tube assembly of claim 5 wherein the pipe section comprises a single unitary piece.

10. A composite flow tube liner for a flow tube assembly of a magnetic flowmeter in accordance with claim 1, the flow tube liner comprising:
a cylindrical substrate having a plurality of perforations and configured for installation within a flow tube assembly of a magnetic flowmeter; and
an interior layer includes a chemically resistant fluoroelastomer and covers an interior surface of the substrate, wherein the interior layer extends into the perforations of the cylindrical substrate, which secures and adheres the interior layer to the cylindrical substrate.

11. The composite flow tube liner of claim 10, wherein the cylindrical substrate comprises a wire mesh.

12. The composite flow tube liner of claim 10, wherein the perforations have a shape selected from the group consisting of circular, oval, and rectangular.

13. The composite flow tube liner of claim 10, wherein the cylindrical substrate comprises a metal selected from the group consisting of aluminum, stainless steel, gold, copper, titanium, chromium, tantalum, vanadium, nickel and a metallic oxide.

14. The flow tube assembly of claim 8 wherein the pipe section comprises a single unitary piece.

15. The flow tube assembly of claim 14, wherein the exterior surface of the cylindrical substrate is bonded to the interior surface of the pipe section.

16. The flow tube assembly of claim 14, wherein:
the pipe section includes a central axis; and
the composite flow tube liner includes opposing flared ends positioned outside the pipe section that extend away from the central axis.

17. The flow tube assembly of claim 14, further comprising a pair of electrodes that are exposed to an interior side of the pipe section.

18. A magnetic flowmeter comprising:
the flow tube assembly of claim 17;
a power amplifier configured to generate the coil current;
a signal processor configured to receive voltages sensed by the electrodes and generate a digital voltage signal indicating a voltage difference between the electrodes that is proportional to the EMF and the flow rate of the fluid flow; and
a digital processor configured to process the digital voltage signal and establish a flow rate of the fluid flow.

19. A method comprising forming a composite flow tube liner for a flow tube assembly of a magnetic flowmeter comprising:
providing a substrate sheet comprising a plurality of perforations and first and second surfaces;
applying a liner sheet comprising a chemically resistant fluoroelastomer over the first surface of the substrate sheet;
pressing the liner sheet against the first surface of the substrate sheet, wherein portions of the liner sheet extend into the perforations of the substrate sheet, which secures and adheres the liner sheet to the substrate sheet and forms a composite liner sheet; and
forming the composite liner sheet into a cylinder wherein the second surface of the substrate sheet forms an exterior of the cylinder;
wherein:
the fluoroelastomer is uncured;
the method comprises heating the liner sheet; and
pressing the liner sheet against the first surface of the substrate sheet comprises pressing the heated sheet against the first surface of the substrate sheet;
heating the liner sheet comprises heating the liner sheet to a first temperature at which the fluoroelastomer flows but will not begin to cure; and
the method comprises curing the fluoroelastomer after pressing the liner sheet including heating the liner sheet to a second temperature that is greater than the first temperature.

20. The method of claim 19, wherein the fluoroelastomer of the liner sheet is fully cured.

21. The method of claim 19, further comprising forming a magnetic flowmeter comprising:
providing:
a pipe section; and
a coil configured to receive a coil current and produce a magnetic field across the pipe section that induces an electromotive force (EMF) in a fluid flow traveling through an interior of the pipe section; and
securing the composite flow tube liner within the interior of the pipe section.

22. The method of claim 21, wherein:
the pipe section includes a central axis; and
securing the composite flow tube liner within the interior of the pipe section comprises flaring opposing ends of the composite flow tube liner positioned outside the pipe section away from the central axis.

23. The flow tube assembly of claim 21 wherein the pipe section comprises a single unitary piece.

* * * * *